United States Patent
Yamaguchi

(10) Patent No.: US 10,661,591 B2
(45) Date of Patent: May 26, 2020

(54) INKJET RECORDING METHOD AND SET OF SUBSTRATE AND INK

(71) Applicant: Konica Minolta, Inc., Tokyo (JP)

(72) Inventor: Go Yamaguchi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/386,613

(22) Filed: Apr. 17, 2019

(65) Prior Publication Data

US 2019/0358986 A1   Nov. 28, 2019

(30) Foreign Application Priority Data

May 25, 2018 (JP) ................................. 2018-101043

(51) Int. Cl.
| | | |
|---|---|---|
| *B41M 7/00* | (2006.01) | |
| *C09D 11/38* | (2014.01) | |
| *C09D 11/322* | (2014.01) | |
| *B41M 5/52* | (2006.01) | |

(52) U.S. Cl.
CPC ........ *B41M 7/0081* (2013.01); *B41M 5/5254* (2013.01); *C09D 11/322* (2013.01); *C09D 11/38* (2013.01)

(58) Field of Classification Search
CPC .. B41M 7/0081; B41M 7/009; B41M 7/0027; B41M 5/0011; C09D 11/101; C09D 11/322; B41J 11/002

USPC ................................. 347/100, 102, 105, 106
See application file for complete search history.

(56) References Cited

U.S. PATENT DOCUMENTS

| | | | | |
|---|---|---|---|---|
| 8,697,194 B2 * | 4/2014 | Odell | ........................ | C09D 4/00 347/100 |
| 8,764,178 B2 * | 7/2014 | Tamanuki | ................ | B41J 2/165 347/100 |
| 8,859,636 B2 * | 10/2014 | Kamada | ............... | C09D 11/101 347/100 |

FOREIGN PATENT DOCUMENTS

| | | |
|---|---|---|
| JP | 2013-121992 A | 6/2013 |
| JP | 2013-221048 A | 10/2013 |
| JP | 2014-166756 A | 9/2014 |

* cited by examiner

*Primary Examiner* — An H Do
(74) *Attorney, Agent, or Firm* — Lucas & Mercanti, LLP

(57) ABSTRACT

An inkjet recording method includes: applying an active ray curable inkjet ink onto a coating layer disposed on a substrate by an inkjet method to form an ink layer, and subsequently irradiating the ink layer with an active ray to cure the ink layer, wherein the substrate has an outermost layer formed by at least one selected from polyethylene terephthalate, nylon, and aluminum, the coating layer is disposed on the outermost layer of the substrate and satisfies a condition that a chlorine/carbon ratio (Cl/C) by surface element analysis using electron spectroscopy for chemical analysis (ESCA) is $0.025 \leq (Cl/C) \leq 0.43$, and the active ray curable inkjet ink contains at least a photopolymerizable compound, a photopolymerization initiator, a pigment, and a gelling agent.

10 Claims, No Drawings

INKJET RECORDING METHOD AND SET OF SUBSTRATE AND INK

The entire disclosure of Japanese patent Application No. 2018-101043, filed on May 25, 2018, is incorporated herein by reference in its entirety.

BACKGROUND

Technological Field

The present invention relates to an inkjet recording method and a set of a substrate and ink, more specifically to an inkjet recording method and a set of a substrate and ink, achieving both suppression of blooming and scratch resistance when an image is recorded on a substrate having an outermost layer formed by polyethylene terephthalate, nylon, or aluminum.

Description of the Related Art

The present applicant discloses a technique of adding a gelling agent to an active ray curable inkjet ink (JP 2013-221048 A, JP 2013-121992 A, and JP 2014-166756 A).

The active ray curable inkjet ink containing a gelling agent can perform phase transition due to the gelling agent, and therefore can be emitted from an inkjet head in a liquid state, and can be gelled after landing on a substrate to prevent ink droplets from gathering with each other.

Studies have also been made to prevent precipitation of wax (hereinafter also referred to as "blooming") on an image surface after such an active ray curable inkjet ink is cured (JP 2013-221048 A and JP 2013-121992 A).

However, in conventional technology, when an image is recorded on a substrate having an outermost layer formed by polyethylene terephthalate, nylon, or aluminum, room for further improvement has been found from a viewpoint of achieving both suppression of blooming and scratch resistance.

SUMMARY

Therefore, an object of the present invention is to provide an inkjet recording method and a set of a substrate and ink, achieving both suppression of blooming and scratch resistance when an image is recorded on a substrate having an outermost layer formed by polyethylene terephthalate, nylon, or aluminum.

Other objects of the present invention will become apparent from the following description.

To achieve at least one of the abovementioned objects, according to an aspect of the present invention, an inkjet recording method reflecting one aspect of the present invention comprises: applying an active ray curable inkjet ink onto a coating layer disposed on a substrate by an inkjet method to form an ink layer; and subsequently irradiating the ink layer with an active ray to cure the ink layer, wherein the substrate has an outermost layer formed by at least one selected from polyethylene terephthalate, nylon, and aluminum, the coating layer is disposed on the outermost layer of the substrate and satisfies a condition that a chlorine/carbon ratio (Cl/C) by surface element analysis using electron spectroscopy for chemical analysis (ESCA) is $0.025 \leq (Cl/C) \leq 0.43$, and the active ray curable inkjet ink contains at least a photopolymerizable compound, a photopolymerization initiator, a pigment, and a gelling agent.

DETAILED DESCRIPTION OF EMBODIMENTS

Hereinafter, one or more embodiments of the present invention will be described. However, the scope of the invention is not limited to the disclosed embodiments.

1. Inkjet Recording Method

In an inkjet recording method according to an embodiment of the present invention, an active ray curable inkjet ink is applied onto a coating layer disposed on a substrate by an inkjet method to form an ink layer, and then the ink layer is irradiated with an active ray to cure the ink layer. Here, the substrate has an outermost layer formed by at least one selected from polyethylene terephthalate, nylon, and aluminum. The coating layer is disposed on the outermost layer of the substrate and satisfies a condition that a chlorine/carbon ratio (Cl/C) by surface element analysis using electron spectroscopy for chemical analysis (ESCA) is $0.025 \leq (Cl/C) \leq 0.43$. The active ray curable inkjet ink contains at least a photopolymerizable compound, a photopolymerization initiator, a pigment, and a gelling agent.

According to such an inkjet recording method, when an image is recorded on a substrate having an outermost layer formed by polyethylene terephthalate, nylon, or aluminum, both suppression of blooming and scratch resistance can be achieved. A reason for this is presumed as follows.

In conventional technology, it has been found that suppression of blooming is difficult when an image is recorded on a substrate having an outermost layer formed by polyethylene terephthalate, nylon, or aluminum. This is considered to be caused by a fact that such an outermost layer has high polarity and high hydrophilicity, affinity thereof to a hydrophobic gelling agent is therefore low, the gelling agent is aligned on an image surface (surface of an ink layer after curing), and blooming easily occurs.

Meanwhile, when a coating layer satisfying a condition that a chlorine/carbon ratio (Cl/C) by surface element analysis using ESCA is $0.025 \leq (Cl/C) \leq 0.43$ is disposed on an outermost layer of a substrate, not only alignment of a gelling agent on a surface of an ink layer is suppressed, but also alignment of the gelling agent on a surface of the coating layer is suppressed. Both suppression of blooming and scratch resistance can be achieved.

When the chlorine/carbon ratio (Cl/C) exceeds 0.43, hydrophilicity of a surface of the coating layer is high, and the gelling agent is aligned on a surface of the ink layer. Therefore, blooming cannot be suppressed.

Meanwhile, when the chlorine/carbon ratio (Cl/C) is less than 0.025, hydrophilicity of a surface of the coating layer is excessively low, and the gelling agent is aligned on the surface of the coating layer. As a result, the strength of a region on a coating layer side in the ink layer is lowered by the gelling agent, and cohesive failure is easily caused by scratching.

Hereinafter, the inkjet recording method will be described in detail.

(1) Substrate

The substrate has an outermost layer formed by at least one selected from polyethylene terephthalate, nylon, and aluminum.

The substrate having an outermost layer formed by polyethylene terephthalate is not particularly limited, but examples thereof include a polyethylene terephthalate film and polyethylene terephthalate laminated paper.

The substrate having an outermost layer formed by nylon is not particularly limited, but examples thereof include a nylon film and nylon laminated paper.

The substrate having an outermost layer formed by aluminum is not particularly limited, but examples thereof include aluminum vapor-deposited paper, aluminum laminated paper, aluminum paste coated paper, and an aluminum vapor-deposited film.

(2) Coating Layer

The coating layer is disposed on an outermost layer of the above-described substrate. Such a coating layer satisfies a condition that a chlorine/carbon ratio (Cl/C) by surface element analysis using ESCA is $0.025 \leq (Cl/C) \leq 0.43$, and preferably $0.05 \leq (Cl/C) \leq 0.20$.

As an analysis condition of surface element analysis using ESCA, for example, a substrate on which a coating layer is formed is cut out such that each side is about 10 mm, and surface composition analysis is performed using ESCA under the following conditions.

Measuring apparatus: "K-Alpha" manufactured by Thermo Scientific Co., Ltd.
Measuring light source: Al (monochromator)
Beam diameter: 400 μm
Neutralizing gun: ON
Spectrum: Narrow mode
Measuring element: C and Cl
Pass energy: 50 eV
Step size: 0.1 eV Cl and C in the chlorine/carbon ratio (Cl/C) correspond to a chlorine atom ratio and a carbon atom ratio (% by mass) present on a surface of the coating layer, respectively, and these atomic ratios are calculated from area intensity.

The coating layer is preferably formed by a polymer, and preferably contains at least a chlorine-containing polymer in order to satisfy the above-described condition for the chlorine/carbon ratio (Cl/C).

Adjustment of the chlorine/carbon ratio (Cl/C) can be appropriately performed, for example, (a) by a method for adjusting a chlorine content in a chlorine-containing polymer, (b) a method for using a plurality of chlorine-containing polymers having different chlorine contents in combination and adjusting a blending ratio thereof, or (c) a method for using a chlorine-containing polymer and a chlorine-free polymer in combination and adjusting a blending ratio thereof.

The coating layer preferably contains at least a vinyl chloride polymer or a vinyl chloride copolymer as a chlorine-containing polymer.

As the vinyl chloride polymer, a vinyl chloride homopolymer can be used.

When the vinyl chloride polymer is used for the coating layer, another polymer is preferably used in combination so as to satisfy the above-described condition for the chlorine/carbon ratio (Cl/C) suitably.

Another polymer to be used in combination with the vinyl chloride polymer preferably can lower the chlorine/carbon ratio (Cl/C) in comparison with a case of using the vinyl chloride polymer alone. As such another polymer, for example, one or more selected from a chlorine-containing polymer having a chlorine content lower than that of a vinyl chloride polymer and a chlorine-free polymer can be used. Examples of such another polymer include a vinyl acetate polymer.

The vinyl chloride copolymer may be any copolymer as long as being obtained by copolymerizing vinyl chloride with another monomer copolymerizable with the vinyl chloride. Examples of such another monomer include vinyl acetate, an acrylic compound, and a styrene compound.

Examples of the acrylic compound include (meth)acrylic acid and (meth)acrylate. Examples of the (meth)acrylate include methyl (meth)acrylate, ethyl (meth)acrylate, propyl (meth)acrylate, isopropyl (meth)acrylate, butyl (meth)acrylate, isobutyl (meth)acrylate, octyl (meth)acrylate, 2-ethylhexyl (meth)acrylate, lauryl (meth)acrylate, stearyl (meth) acrylate, 2-hydroxyethyl (meth)acrylate, 2-hydroxypropyl (meth)acrylate, 2-(dimethylamino) ethyl (meth)acrylate, 2-(diethylamino) ethyl (meth)acrylate, 2-methoxyethyl (meth)acrylate, 2-butoxyethyl (meth)acrylate, and glycidyl (meth)acrylate.

Examples of the styrene compound include styrene and α-methylstyrene.

A vinyl chloride-vinyl acetate copolymer obtained by copolymerizing vinyl chloride and vinyl acetate is commercially available, for example, as "VINYBLAN 603" manufactured by Shin-Etsu Chemical Co., Ltd. (VINYBLAN is a registered trademark, the same applies hereinafter).

A vinyl chloride-acrylic compound copolymer obtained by copolymerizing vinyl chloride and an acrylic compound is commercially available, for example, as "VINYBLAN 271", "VINYBLAN 278", "VINYBLAN 690", "VINYBLAN 902", or "VINYBLAN 900" manufactured by Shin-Etsu Chemical Co., Ltd.

The chlorine-containing polymer is not limited to a vinyl chloride-based polymer using vinyl chloride as a monomer as exemplified above, and a polymer containing at least carbon and chlorine in a molecule thereof can be used. As such a chlorine-containing polymer, for example, chlorinated polyolefin or chlorinated (ethylene-vinyl acetate copolymer) may be used. The chlorinated polyolefin and chlorinated (ethylene-vinyl acetate copolymer) are commercially available, for example, as "SUPERCHLON" (registered trademark) series manufactured by Nippon Paper Industries Co., Ltd.

The chlorine-containing polymer preferably has a side chain (C—Cl) formed by a chlorine atom in a main chain (C—C) formed by a carbon atom, such as a vinyl chloride polymer or a vinyl chloride copolymer. In the coating layer, the side chain (C—Cl) has high polarity and therefore can be aligned and adhere to a highly polar outermost layer side of the substrate. As a result, the coating layer serving as a base of the ink layer is stabilized, and the ink layer is held rigidly to improve scratch resistance. At this time, in the coating layer, the main chain (C—C) with low polarity exhibits affinity to a gelling agent. Therefore, although having the side chain (C—Cl) with high polarity, the coating layer can suppress alignment of the gelling agent on a surface of the ink layer and also exhibits blooming suppressing effect satisfactorily.

When a chlorine-free polymer is used in combination with a chlorine-containing polymer, the chlorine-free polymer is not particularly limited, and for example, one or more selected from a vinyl acetate polymer, a polymer of the above-described acrylic compound, an ethylene-vinyl acetate copolymer, and a polyolefin can be used.

(3) Active Ray Curable Inkjet Ink

A. Photopolymerizable Compound and Photopolymerization Initiator

As the ink, an ink (ink composition) curable by an active ray can be used, and specifically, an ink containing a photopolymerizable compound can be used. Examples of such an ink include a radically curable ink containing a radically polymerizable compound and a cationically curable ink containing a cationically polymerizable compound.

The "active ray" is a ray that can impart energy to generate an initiating species in an ink composition by irradiation therewith, and includes an a ray, a γ ray, an X ray, an ultraviolet ray, an electron beam, and the like. Among these rays, an ultraviolet ray and an electron beam are preferable, and an ultraviolet ray is more preferable from viewpoints of curing sensitivity and availability of an apparatus.

The photopolymerizable compound is polymerized by being irradiated with the active ray and cures the ink. The photopolymerizable compound may be any one of a monomer, a polymerizable oligomer, a prepolymer, and a mixture thereof. Only one kind or two or more kinds of the photopolymerizable compounds may be contained in the ink.

The content of the photopolymerizable compound is, for example, preferably in a range of 1 to 97% by mass with respect to the total mass of the ink from a viewpoint of film physical properties such as curability and flexibility, and more preferably in a range of 30 to 95% by mass.

The radically polymerizable compound is not particularly limited, and examples thereof include an N-vinyl compound (compound having N—C=C structure) and an unsaturated carboxylate. These compounds may be used singly or in combination of a plurality of kinds thereof. For example, one or more N-vinyl compounds and one or more unsaturated carboxylates may be used in combination.

Examples of the N-vinyl compound include N-vinylcaprolactam, N-vinylpyrrolidone, and N-vinylformamide. Examples of N-vinylcaprolactam include N-vinyl-2-caprolactam. Examples of N-vinylpyrrolidone include N-vinyl-2-pyrrolidone.

Examples of the unsaturated carboxylate include (meth)acrylate.

Note that here, "(meth)acrylate" means an acrylate or a methacrylate, "(meth)acryloyl group" means an acryloyl group or a methacryloyl group, and "(meth)acrylic" means acrylic or methacrylic.

Examples of the (meth)acrylate include: monofunctional acrylates including isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethylhexahydrophthalic acid, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethylsuccinic acid, 2-(meth)acryloyloxyethylphthalic acid, 2-(meth)acryloyloxyethyl-2-hydroxyethyl-phthalic acid, and t-butylcyclohexyl (meth)acrylate; bifunctional (meth)acrylates including triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate having a bisphenol A structure, hydroxypivalic acid neopentyl glycol di(meth)acrylate, polytetramethylene glycol di(meth)acrylate, polyethylene glycol diacrylate, and tripropyleneglycol diacrylate; tri- or higher functional (meth)acrylates including trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth)acrylate, and pentaerythritol ethoxy tetra(meth)acrylate; (meth)acryloyl group-containing oligomers including a polyester acrylate oligomer, and modified products thereof.

Examples of the modified products include an ethylene oxide-modified (EO-modified) acrylate having an ethylene oxide group inserted thereinto, a propylene oxide-modified (PO-modified) acrylate having propylene oxide inserted thereinto, and a caprolactone-modified acrylate.

As the (meth)acrylate, one or more (meth)acrylate compounds each having a molecular weight in a range of 280 to 1,500 and a ClogP value in a range of 4.0 to 7.0 (hereinafter also simply referred to as "(meth)acrylate compound A") may be contained.

By inclusion of the (meth)acrylate compound A in the ink, it is possible to appropriately increase ink viscosity after landing and to further improve image quality. In particular, by inclusion of the (meth)acrylate compound A and a gelling agent in the ink, such an effect is remarkable.

The (meth)acrylate compound A more preferably has two or more (meth)acrylate groups.

The molecular weight of the (meth)acrylate compound A is in a range of 280 to 1,500 as described above, and more preferably in a range of 300 to 800.

Here, the molecular weight of the (meth)acrylate compound A can be measured using the following commercially available software package 1 or 2.

Software package 1: MedChem Software (Release 3.54, August 1991, Medicinal Chemistry Project, Pomona College, Claremont, Calif.)

Software package 2: Chem Draw Ultra ver. 8.0. (April 2003, CambridgeSoft Corporation, USA)

The "log P value" is a coefficient indicating affinity of an organic compound to water and 1-octanol. The distribution coefficient P of 1-octanol/water is a ratio between the equilibrium concentration of a compound in 1-octanol and the equilibrium concentration of the compound in water at distribution equilibrium when a minute amount of the compound is dissolved as a solute in a solvent of two liquid phases of 1-octanol and water, and is represented by a logarithm log P thereof with respect to a bottom 10. That is, the "log P value" is a logarithmic value of the distribution coefficient of 1-octanol/water, which is known as an important parameter representing hydrophilicity/hydrophobicity of a molecule.

The "ClogP value" is a log P value calculated by calculation. The ClogP value can be calculated by a fragment method, an atomic approach method, or the like. More specifically, in order to calculate the ClogP value, it is only required to use a fragment method described in literature (C. Hansch and A. Leo, "Substituent Constants for Correlation Analysis in Chemistry and Biology" (John Wiley & Sons, New York, 1969)) or the following commercially available software package 1 or 2.

Software package 1: MedChem Software (Release 3.54, August 1991, Medicinal Chemistry Project, Pomona College, Claremont, Calif.)

Software package 2: Chem Draw Ultra ver. 8.0. (April 2003, CambridgeSoft Corporation, USA)

The numerical value of the ClogP value described here is a "ClogP value" calculated using software package 2.

The amount of the (meth)acrylate compound A contained in the ink is not particularly limited, but is preferably in a range of 1 to 40% by mass, and more preferably in a range of 5 to 30% by mass in the total mass of the ink. By setting the amount of the (meth)acrylate compound A to 1% by mass or more, the ink does not become too hydrophilic, and the gelling agent is sufficiently dissolved in the ink. Therefore, the ink easily undergoes a sol-gel phase transition.

Meanwhile, by setting the amount of the (meth)acrylate compound A to 40% by mass or less, the photopolymerization initiator can be sufficiently dissolved in the ink.

More preferable examples of the (meth)acrylate compound A include (1) a tri- or higher functional methacrylate or acrylate compound having 3 to 14 structures represented by (—C(CH$_3$)H—CH$_2$—O—) in a molecule thereof and (2) a di- or higher functional methacrylate or acrylate compound having a cyclic structure in a molecule thereof. These (meth)acrylate compounds have high photocurability and little shrinkage upon curing. Furthermore, repetition reproducibility of sol-gel phase transition is high.

A tri- or higher functional methacrylate or acrylate compound having 3 to 14 structures represented by (—C(CH$_3$)H—CH$_2$—O—) in a molecule thereof is, for example, a compound obtained by modifying a hydroxy group of a compound having three or more hydroxy groups with propylene oxide, and esterifying the resultant modified product with (meth)acrylic acid. Specific examples of this compound include 3PO-modified trimethylolpropane triacrylate (molecular weight: 471, ClogP: 4.90, "Photomer 4072" manufactured by Cognis Holding GmbH) and 3PO-modified trimethylolpropane triacrylate (molecular weight: 471, ClogP: 4.90, "Miramer M360" manufactured by Miwon Specialty Chemical Co., Ltd.).

Examples of the di- or higher functional methacrylate or acrylate compound having a cyclic structure in a molecule thereof include a compound obtained by esterifying a hydroxy group of a compound having two or more hydroxy groups and tricycloalkane with (meth)acrylic acid. Specific examples of this compound include tricyclodecane dimethanol diacrylate (molecular weight: 304, ClogP: 4.69, "NK Ester A-DCP" manufactured by Shin-Nakamura Chemical Co., Ltd.) and tricyclodecanedimethanol dimethacrylate (molecular weight: 332, ClogP: 5.12, "NK Ester DCP" manufactured by Shin-Nakamura Chemical Co., Ltd.).

Other specific examples of the (meth)acrylate compound A include 1,10-decanediol dimethacrylate (molecular weight: 310, ClogP: 5.75, "NK Ester DOD-N" manufactured by Shin-Nakamura Chemical Co., Ltd.).

As the (meth)acrylate, one or more (meth)acrylates other than the above-described (meth)acrylate compound A may be contained. One or more (meth)acrylate compounds A and one or more (meth)acrylates other than the (meth)acrylate compound A may be used in combination.

Examples of the (meth)acrylate other than the (meth)acrylate compound A include a (meth)acrylate monomer or an oligomer having a ClogP value of less than 4.0, a (meth)acrylate monomer or an oligomer having a ClogP value of more than 7.0, and other polymerizable oligomers.

Examples of these (meth)acrylate monomers or oligomers include: 4EO-modified hexanediol diacrylate ("CD561" manufactured by Sartomer, molecular weight 358); 3EO-modified trimethylolpropane triacrylate ("SR454" manufactured by Sartomer, molecular weight 429); 4EO-modified pentaerythritol tetraacrylate ("SR494" manufactured by Sartomer, molecular weight 528); 6EO-modified trimethylolpropane triacrylate ("SR499" manufactured by Sartomer, molecular weight 560); caprolactone acrylate ("SR495B" manufactured by Sartomer, molecular weight 344); polyethylene glycol diacrylate ("NK Ester A-400" manufactured by Shin-Nakamura Chemical Co., Ltd., molecular weight 508), ("NK Ester A-600" manufactured by Shin-Nakamura Chemical Co., Ltd., molecular weight 708); polyethylene glycol dimethacrylate "NK Ester 9G" manufactured by Shin-Nakamura Chemical Co., Ltd., molecular weight 536), ("NK Ester 14G" manufactured by Shin-Nakamura Chemical Co., Ltd.); tetraethylene glycol diacrylate ("V #335HP" manufactured by Osaka Organic Chemical Industry Ltd., molecular weight 302); stearyl acrylate ("STA" manufactured by Osaka Organic Chemical Industry Ltd.); phenol EO-modified acrylate ("M144" manufactured by Miwon Specialty Chemical Co., Ltd.); and nonylphenol EO-modified acrylate ("M166" manufactured by Miwon Specialty Chemical Co., Ltd.).

As the (meth)acrylate, for example, an epoxy acrylate, a urethane acrylate, a polyester acrylate, or a linear acrylic oligomer may be used. Examples of the urethane acrylate include an aliphatic urethane acrylate and an aromatic urethane acrylate.

Examples of the cationically polymerizable compound include an epoxy compound, a vinyl ether compound, and an oxetane compound. These compounds may be used singly or in combination of a plurality of kinds thereof.

Examples of the epoxy compound include an aromatic epoxide, an alicyclic epoxide, and an aliphatic epoxide.

The aromatic epoxide may be di- or poly-glycidyl ether obtained by a reaction between a polyhydric phenol or an alkylene oxide adduct thereof and epichlorohydrin. Examples of the polyhydric phenol or an alkylene oxide adduct thereof used for the reaction include bisphenol A or an alkylene oxide adduct thereof. The alkylene oxide in the alkylene oxide adduct may be ethylene oxide, propylene oxide, or the like.

The alicyclic epoxide may be a cycloalkane oxide-containing compound obtained by epoxidizing a cycloalkane-containing compound with an oxidizing agent such as hydrogen peroxide or a peracid. A cycloalkane in the cycloalkane oxide-containing compound may be cyclohexene or cyclopentene.

The aliphatic epoxide may be di- or poly-glycidyl ether obtained by a reaction between an aliphatic polyhydric alcohol or an alkylene oxide adduct thereof and epichlorohydrin. Examples of the aliphatic polyhydric alcohol include an alkylene glycol such as ethylene glycol, propylene glycol, or 1,6-hexanediol. The alkylene oxide in the alkylene oxide adduct may be ethylene oxide, propylene oxide, or the like.

Examples of the vinyl ether compound include: a monovinyl ether compound such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, or octadecyl vinyl ether; and a di- or tri-vinyl ether compound such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, or trimethylolpropane trivinyl ether.

Examples of the oxetane compound include di(1-ethyl-3-oxetanyl) methyl ether, 3-ethyl-3-(2-ethylhexyloxymethyl) oxetane, 3-ethyl-3-hydroxymethyloxetane, 1,4-bis[(3-ethyl-3-oxetanyl) methoxymethyl]benzene, and 3-ethyl-3-(phenoxymethyl) oxetane.

The oxetane compound may be any compound as long as having one or more oxetane rings in a molecule thereof, and examples thereof include oxetane compounds described in JP 2001-220526 A, JP 2001-310937 A, and JP 2005-255821 A. Among these compounds, the compounds represented by the following general formulas (1), (2), (7), (8), and (9) described in JP 2005-255821 A are preferable.

[Chemical formula 1]

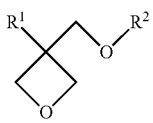
General formula (1)

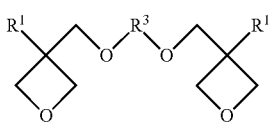
General formula (2)

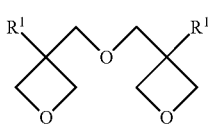
General formula (7)

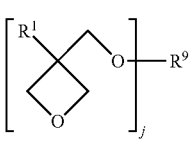
General formula (8)

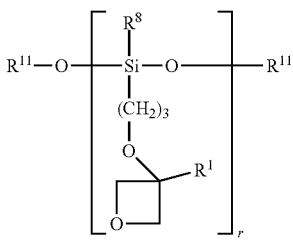
General formula (9)

In the above general formulas (1), (2), (7), (8), and (9), $R^1$ represents, for example, a hydrogen atom, an alkyl group having 1 to 6 carbon atoms, a fluoroalkyl group having 1 to 6 carbon atoms, an allyl group, an aryl group, a furyl group, or a thienyl group. $R^2$ represents, for example, an alkyl group having 1 to 6 carbon atoms, an alkenyl group having 2 to 6 carbon atoms, a phenyl group, a benzyl group, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. $R^3$ represents, for example, a linear or branched alkylene group, a linear or branched poly(alkyleneoxy) group, a linear or branched unsaturated hydrocarbon group, a carbonyl group or an alkylene group containing a carbonyl group, an alkylene group containing a carboxyl group, or an alkylene group containing a carbamoyl group. $R^8$ represents, for example, an alkyl group having 1 to 4 carbon atoms or an aryl group. $R^9$ represents, for example, a branched alkylene group having 1 to 12 carbon atoms, a branched poly(alkyleneoxy) group, or a branched polysiloxy group. $R^{11}$ represents, for example, an alkyl group having 1 to 4 carbon atoms or a trialkylsilyl group. j represents, for example, 3 or 4, and r represents, for example, 1 to 4.

As the photopolymerization initiator, when the above-described photopolymerizable compound is a compound having a radically polymerizable functional group (radically polymerizable compound), a photo-radical initiator can be used, and when the photopolymerizable compound is a compound having a cationically polymerizable functional group (cationically polymerizable compound), a photoacid generator can be used.

The photopolymerization initiator may be used singly or in combination of a plurality of kinds thereof. As the photopolymerization initiator, one or more photo-radical initiators and one or more photoacid generators may be used in combination.

Examples of the photo-radical initiator include a cleavage type radical initiator and a hydrogen abstraction type radical initiator.

Examples of the cleavage type radical initiator include an acetophenone-based initiator, a benzoin-based initiator, an acylphosphine oxide-based initiator, benzyl, and a methylphenylglyoxy ester.

Examples of the acetophenone-based initiator include diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy) phenyl-(2-hydroxy-2-propyl) ketone, 1-hydroxycyclohexyl-phenylketone, 2-methyl-2-morpholino (4-thiomethylphenyl) propan-1-one, and 2-benzyl-2-dimethylamino-1-(4-morpholinophenyl)-butanone.

Examples of the benzoin-based initiator include benzoin, benzoin methyl ether, and benzoin isopropyl ether.

Examples of the acylphosphine oxide-based initiator include 2,4,6-trimethylbenzoin diphenylphosphine oxide.

Examples of the hydrogen abstraction type radical initiator include a benzophenone-based initiator, a thioxanthone-based initiator, an aminobenzophenone-based initiator, 10-butyl-2-chloroacridone, 2-ethylanthraquinone, 9,10-phenanthrene quinone, and camphorquinone.

Examples of the benzophenone-based initiator include benzophenone, methyl o-benzoylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl) benzophenone, and 3,3'-dimethyl-4-methoxybenzophenone.

Examples of the thioxanthone-based initiator include 2-isopropylthioxanthone, 2,4-dimethylthioxanthone, 2,4-diethylthioxanthone, and 2,4-dichlorothioxanthone.

Examples of the aminobenzophenone-based initiator include Michler's ketone and 4,4'-diethylaminobenzophenone.

Examples of the photoacid generator include: a triarylsulfonium salt such as triallylsulfonium hexafluorophosphate or triarylsulfonium hexafluoroantimonate; an iodonium salt such as diaryliodonium hexafluorophosphate, diphenyliodonium hexafluoroantimonate, bis(dodecylphenyl) iodonium tetrakis(pentafluorophenyl) borate, or iodonium [4-(4-methylphenyl-2-methylpropyl) phenyl] hexafluorophosphate; a phosphonium salt such as tetrafluorophosphonium hexafluorophosphate; and a pyridium salt. As the photoacid generator, for example, a commercially available product such as "CPI-100P" (propylene carbonate of triallyl sulfonium salt) manufactured by San-Apro Ltd. may be used.

Examples of the photoacid generator include compounds described in "Organic Materials for Imaging" edited by the Institute of Organic Electronics Materials, Bunshin-Publishing (1993), pages 187 to 192.

The content of the photopolymerization initiator may be any content within a range in which the ink can be sufficiently cured, and can be, for example, in a range of 0.01 to 10% by mass with respect to the total mass of the ink.

B. Pigment

The pigment is not particularly limited, but preferably contains at least titanium oxide from viewpoints of remarkably exhibiting blooming suppressing effect by the coating layer and further improving scratch resistance.

Titanium oxide has high hydrophilicity compared with pigments of other colors and has low affinity to the hydrophobic gelling agent, and therefore inherently promotes alignment of the gelling agent on a surface of the ink layer to easily cause blooming. Therefore, by disposing the coating layer, the blooming suppressing effect is remarkably exhibited as compared with a case where the coating layer is not disposed.

In addition, titanium oxide having high hydrophilicity is easily conformable to the coating layer that is appropriately hydrophilic, and therefore also contributes to suppressing alignment of the gelling agent to a coating layer side. This can further improve scratch resistance. Therefore, titanium oxide contributes to balancing distribution of the gelling agent in the ink layer so as to achieve both the blooming suppressing effect and scratch resistance suitably.

Titanium oxide can be used as a white pigment.

The pigment is not limited to titanium oxide and, for example, organic pigments and inorganic pigments having the following numbers described in the Color Index can also be used. These pigments may be used in combination with titanium oxide.

Examples of red and magenta pigments include a pigment selected from Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36, and a mixture thereof.

Examples of blue and cyan pigments include a pigment selected from Pigment Blue 1, 15, 15: 1, 15: 2, 15: 3, 15: 4, 15: 6, 16, 17-1, 22, 27, 28, 29, 36, and 60, and a mixture thereof.

Examples of a green pigment include a pigment selected from Pigment Green 7, 26, 36, and 50, and a mixture thereof.

Examples of a yellow pigment include a pigment selected from Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193, and a mixture thereof.

Examples of a black pigment include a pigment selected from Pigment Black 7, 28, and 26, and a mixture thereof.

The pigment can be dispersed, for example, by a ball mill, a sand mill, an attritor, a roll mill, an agitator, a Henschel mixer, a colloid mill, an ultrasonic homogenizer, a pearl mill, a wet jet mill, or a paint shaker.

The average dispersed particle diameter of pigment particles is preferably in a range of 50 to 150 nm, and the maximum particle diameter thereof is preferably in a range of 300 to 1000 nm from a viewpoint of further enhancing a discharge property from an inkjet head. A more preferable average dispersed particle diameter is in a range of 80 to 130 nm.

The average dispersed particle diameter of pigment particles means a value obtained by a dynamic light scattering method using Data Sizer Nano ZSP manufactured by Malvern Panalytical Ltd. Note that the ink containing the pigment has a high concentration, and light does not pass through the ink using this measuring apparatus. Therefore, measurement is performed after the ink is diluted by 200 times. Measurement temperature is set to normal temperature (25° C.).

Dispersion of the pigment is adjusted according to selection of the pigment, a dispersant, and a dispersion medium, dispersion conditions, filtration conditions, and the like.

The ink may contain a dispersant in order to enhance dispersibility of the pigment.

Examples of the dispersant include a hydroxy group-containing carboxylate, a salt of a long chain polyaminoamide and a high molecular weight acid ester, a salt of a high molecular weight polycarboxylic acid, a salt of a long chain polyaminoamide and a polar acid ester, a high molecular weight unsaturated acid ester, a high molecular copolymer, a modified polyurethane, a modified polyacrylate, a polyether ester type anion activator, a naphthalene sulfonic acid formalin condensate salt, an aromatic sulfonic acid formalin condensate salt, polyoxyethylene alkyl phosphate, polyoxyethylene nonyl phenyl ether, and stearyl amine acetate. Examples of a commercially available dispersant include "Solsperse" series manufactured by Avecia Limited, and "PB" series manufactured by Ajinomoto Fine Techno Co., Ltd.

The ink may further contain a dispersing aid as necessary. It is only required to select the dispersing aid depending on the pigment.

The total amount of the dispersant and the dispersing aid is preferably in a range of 1 to 50% by mass with respect to the pigment.

The ink may further contain a dispersion medium for dispersing the pigment as necessary. The ink may contain a solvent as a dispersion medium. However, in order to suppress a residual solvent in a formed image, the above-described photopolymerizable compound is preferably used as a dispersion medium.

The content of the pigment is preferably in a range of 0.1 to 20% by mass, and more preferably in a range of 0.4 to 10% by mass with respect to the total amount of the ink.

C. Gelling Agent

Examples of the gelling agent include wax gel. Only one kind or two or more kinds of the gelling agents may be contained in the ink.

In the wax gel, the gelling agent itself forms a plate-shaped crystal, which has a card house structure to form a gel structure.

The content of the gelling agent is preferably in a range of 0.5 to 10.0% by mass, and more preferably in a range of 1.0 to 5.0% by mass with respect to the total mass of the ink from viewpoints of improving image quality and improving laminate adhesion.

The gelling agent is preferably crystallized in the ink at a temperature equal to or lower than the gelling temperature of the ink from the following viewpoints. The gelling temperature is a temperature at which the viscosity of ink which has become sol or liquid by heating rapidly changes due to a phase transition of the gelling agent from sol to gel while the ink is cooled. Specifically, the gelling temperature of ink which has become sol or liquid can be a temperature at which the viscosity of the ink is rapidly increased while the ink is cooed with the viscosity measured using a viscoelasticity measuring device (for example, "MCR300" manufactured by Physica Co.).

When the gelling agent is crystallized in the ink, a structure in which an ink medium such as a solvent or a photopolymerizable compound is encapsulated in a three-dimensional space formed by the gelling agent crystallized in a plate shape may be formed (such a structure is hereinafter referred to as a "card house structure").

When the card house structure is formed, a liquid ink medium is held in the space. Therefore, ink droplets are less likely to cause wet spreading, and a pinning property of the ink is further enhanced. When the pinning property of the ink is enhanced, the ink droplets which have landed on a recording medium are less likely to gather with each other, and a higher definition image can be formed.

In order to form the card house structure, the ink medium such as a solvent or a photopolymerizable compound in the ink is preferably compatible with the gelling agent.

Examples of a suitable gelling agent for forming the card house structure by crystallization include a fatty acid ketone (ketone wax), a fatty acid ester (ester wax), a petroleum-based wax, a fatty acid amide, a higher fatty acid, and a higher alcohol.

Examples of the ketone wax include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Examples of the ester wax include behenyl behenate, eicosyl eicosanate, stearyl stearate, palmityl stearate, cetyl palmitate, myristyl myristate, cetyl myristate, myricyl serotinate, stearyl stearate, oleyl palmitate, a glycerin fatty acid ester, a sorbitan fatty acid ester, a propylene glycol fatty acid ester, an ethylene glycol fatty acid ester, and a polyoxyethylene fatty acid ester. Examples of a commercially available product of the ester wax include "EMALEX" series manufactured by Nihon Emulsion Co., Ltd. ("EMALEX" is a registered trademark of Nihon Emulsion Co., Ltd.), and "Liquemar" series and "Poem" series manufactured by Riken Vitamin Co., Ltd. ("Rikemar" and "Poem" are registered trademarks of Riken Vitamin Co., Ltd.).

Examples of the petroleum-based wax include a paraffin wax, a microcrystalline wax, and petroleum.

Examples of the higher fatty acid include behenic acid, arachidic acid, stearic acid, palmitic acid, myristic acid, lauric acid, oleic acid, and erucic acid.

Examples of the higher alcohol include stearyl alcohol and behenyl alcohol.

Examples of the hydroxystearic acid include 12-hydroxystearic acid.

Examples of the fatty acid amide include lauric acid amide, stearic acid amide, behenic acid amide, oleic acid amide, erucic acid amide, ricinoleic acid amide, and 12-hydroxystearic acid amide. Examples of a commercially available product of the fatty acid amide include "Diamid Y" and "Nikka Amide" series manufactured by Nippon Kasei Chemical Co., Ltd. ("Diamid" and "Nikka Amide" are registered trademarks of Nippon Kasei Chemical Co., Ltd.), "ITOWAX" series manufactured by Itoh Oil Chemicals Co. Ltd., and "FATTYAMID" series manufactured by Kao Corporation.

Among the gelling agents, a ketone wax, an ester wax, a higher fatty acid, a higher alcohol, and a fatty acid amide are preferable from a viewpoint of pinning effect. A compound (ketone wax) represented by the following general formula (G1) and a compound (ester wax) represented by the following general formula (G2) are particularly preferable from a viewpoint of pinning effect.

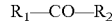   General formula (G1):

   General formula (G2):

[In the formulas, $R_1$ to $R_4$ each independently represent a linear or branched hydrocarbon group having 9 to 25 carbon atoms.]

Only one kind of the ketone wax represented by the general formula (G1) and the ester wax represented by the general formula (G2), or two or more kinds thereof may be contained in the ink. Only either one of the ketone wax represented by the following general formula (G1) and the ester wax represented by the following general formula (G2), or both thereof may be contained in the ink.

In the ketone wax represented by the general formula (G1) or the ester wax represented by the general formula (G2), the carbon number of a linear or branched hydrocarbon group is 9 or more, and therefore crystallinity of the gelling agent is further enhanced, and a more sufficient space is generated in the card house structure. Therefore, the ink medium such as a solvent or a photopolymerizable compound is easily encapsulated sufficiently in the space, and the pinning property of the ink is further enhanced. In addition, the carbon number of the linear or branched hydrocarbon group is 25 or less, therefore the melting point of the gelling agent is not excessively raised, and therefore it is not necessary to excessively heat the ink when the ink is emitted. $R_1$ and $R_2$, or $R_3$ and $R_4$ each particularly preferably represent a linear or branched hydrocarbon group having 13 or more and less than 23 carbon atoms from these viewpoints.

Either $R_1$ or $R_2$, or either $R_3$ or $R_4$ preferably represents a saturated hydrocarbon group having 11 or more and less than 23 carbon atoms from a viewpoint of raising the gelling temperature of the ink and making the ink gel more rapidly after landing. Both $R_1$ and $R_2$, or both $R_3$ and $R_4$ more preferably represent saturated hydrocarbon groups each having 11 or more and less than 23 carbon atoms from these viewpoints.

Examples of the ketone wax represented by the general formula (G1) include dilignoceryl ketone (carbon number: 23 or 24), dibehenyl ketone (carbon number: 21 or 22), distearyl ketone (carbon number: 17 or 18), dieicosyl ketone (carbon number: 19 or 20), dipalmityl ketone (carbon number: 15 or 16), dimyristyl ketone (carbon number: 13 or 14), dilauryl ketone (carbon number: 11 or 12), lauryl myristyl ketone (carbon number: 11 to 14), lauryl palmityl ketone (carbon number: 11 to 16), myristyl palmityl ketone (carbon number: 13 to 16), myristyl stearyl ketone (carbon number: 13 to 18), myristyl behenyl ketone (carbon number: 13 to 22), palmityl stearyl ketone (carbon number: 15 to 18), palmityl behenyl ketone (carbon number: 15 to 22), and stearyl behenyl ketone (carbon number: 17 to 22). Note that the carbon number in the parenthesis represents the carbon number of each of two hydrocarbon groups divided by a carbonyl group. Examples of a commercially available product of the ketone wax represented by general formula (G1) include "18-Pentatriacontanon" manufactured by Alfa Aeser, "Hentriacontan-16-on" manufactured by Alfa Aeser, and "Kaowax T-1" manufactured by Kao Corporation.

Examples of the fatty acid or the ester wax represented by general formula (G2) include behenyl behenate (carbon number: 21 or 22), eicosyl eicosanate (carbon number: 19 or 20), stearyl stearate (carbon number: 17 or 18), palmityl stearate (carbon number: 17 or 16), lauryl stearate (carbon number: 17 to 12), cetyl palmitate (carbon number: 15 or 16), stearyl palmitate (carbon number: 15 to 18), myristyl myristate (carbon number: 13 or 14), cetyl myristate (carbon number: 13 to 16), octyldodecyl myristate (carbon number: 13 to 20), stearyl oleate (carbon number: 17 or 18), stearyl erucate (carbon number: 21 to 18), stearyl linoleate (carbon number: 17 or 18), behenyl oleate (carbon number: 18 to 22), and arachidyl linoleate (carbon number: 17 to 20). Note that the carbon number in the parenthesis represents the carbon number of each of two hydrocarbon groups divided by an ester group. Examples of a commercially available product of the ester wax represented by general formula (G2) include "UNISTER M-2222SL" and "Spermaceti" manufactured by NOF CORPORATION ("UNISTER" is a registered trademark of NOF CORPORATION), "EXCEPARL SS" and "EXCERPY MY-M" manufactured by Kao Corporation ("EXCEPARL" is a registered trademark of Kao Corporation), "EMALEX CC-18" and "EMALEX CC-10" manufactured by Nihon Emulsion Co., Ltd. ("EMALEX" is a registered trademark of Nihon Emulsion Co., Ltd.), and "AMREPS PC" manufactured by Kokyu Alcohol Kogyo Co., Ltd. ("AMREPS" is a registered trademark of Kokyu Alcohol Kogyo Co., Ltd.).

When a commercially available product is a mixture of two or more kinds of compounds, the compounds can be separated from each other and purified as necessary to be contained in the ink.

The content of the gelling agent is preferably 0.5% by mass or more and 5% by mass or less, and more preferably 1% by mass or more and 3% by mass or less with respect to the total amount of the ink. By setting the content of the gelling agent to 0.5% by mass or more, mixing of inks (also referred to as liquid gathering) is suitably prevented, and a color boundary is clarified. By setting the content of the gelling agent to 5% by mass or less, scratch resistance is further improved.

D. Others

The ink may contain a component other than the components described above within a range in which the effect of the present invention can be obtained. Examples of the other component include a polymerization inhibitor and a surfactant. Only one kind or a plurality of kinds of the components may be contained in the ink.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene) aniline oxide, dibutyl cresol, cyclohexanone oxime cresol, guaiacol, o-isopropyl phenol, butyral doxime, methylethyl ketoxime, and cyclohexanone oxime.

The amount of the polymerization inhibitor can be arbitrarily set within a range in which the effect of the present invention can be obtained and can be, for example, 0.001% by mass or more and less than 1.0% by mass with respect to the total mass of the ink.

Examples of the surfactant include an anionic surfactant such as a dialkyl sulfosuccinate, an alkylnaphthalene sulfonate, or a fatty acid salt; a nonionic surfactant such as a polyoxyethylene alkyl ether, a polyoxyethylene alkyl allyl ether, an acetylene glycol, or a polyoxy ethylene-polyoxypropylene block copolymer, a cationic surfactant such as an alkylamine salt or a quaternary ammonium salt; and a silicone-based or fluorine-based surfactant.

Examples of the silicone-based surfactant include a polyether-modified polysiloxane compound. Examples of the fluorine-based surfactant include a compound having a structure in which some or all of hydrogen atoms are replaced with fluorine atoms in place of hydrogen atoms bonded to carbon atoms of a hydrophobic group of a usual surfactant.

The amount of the surfactant can be arbitrarily set within a range in which the effect of the present invention can be obtained. The amount of the surfactant can be, for example, 0.001% by mass or more and less than 1.0% by mass with respect to the total mass of the ink.

The viscosity of the ink at 80° C. is preferably in a range of 3 to 20 mPa·s, and more preferably in a range of 7 to 12 mPa·s from a viewpoint of further enhancing a discharge property of the ink. The viscosity of the inkjet ink according to an embodiment of the present invention at 25° C. is preferably 1000 mPa·s or more from a viewpoint of sufficiently making the ink gel when the ink is landed and the temperature thereof is lowered to normal temperature.

The gelling temperature of the ink is preferably in a range of 30 to 70° C. When the gelling temperature of the ink is 30° C. or higher, or 40° C. or higher, the ink rapidly becomes gel after landing on a recording medium, and therefore a pinning property is further enhanced. When the gelling temperature of the ink is 70° C. or lower, or 60° C. or lower, the ink hardly becomes gel when the ink is emitted from an inkjet head having an ink temperature of usually about 80° C. Therefore, the ink can be emitted more stably.

The viscosity of the ink at 80° C., and the viscosity and the gelling temperature thereof at 25° C. can be determined by measuring a temperature change of dynamic viscoelasticity of the ink with a rheometer. Specifically, the ink is heated to 100° C., and the ink is cooled to 20° C. under conditions of a shear rate of 11.7 (1/s) and a temperature-lowering rate of 0.1° C./s while the viscosity is measured with a stress control type rheometer Physica MCR301 (cone plate diameter: 75 mm, cone angle: 1.0°) manufactured by Anton Paar GmbH, and a temperature change curve of viscosity is thereby obtained. The viscosity at 80° C. and the viscosity at 25° C. can be determined by reading the viscosity at 80° C. and the viscosity at 25° C. in the temperature change curve of viscosity, respectively. The gelling temperature can be determined as a temperature at which the viscosity is 200 mPa·s in the temperature change curve of viscosity.

(4) Inkjet Method

By applying an active ray curable inkjet ink onto a coating layer disposed on a substrate, an ink layer can be formed. An inkjet method can be used for applying ink.

The inkjet method is not particularly limited as long as the ink layer can be formed on the coating layer using ink. The active ray curable inkjet type inkjet recording apparatus includes a line recording type (single pass recording type) apparatus and a serial recording type apparatus, which can be appropriately selected according to required image resolution and recording speed.

An ink discharge method from an inkjet head may be either an on-demand method or a continuous method. The on-demand type inkjet head may be either an electromechanical conversion (piezo) type such as a single cavity type, a double cavity type, a bender type, a piston type, a share mode type, or a shared wall type, or an electrothermal conversion type such as a thermal inkjet type or a bubble jet (bubble jet is a registered trademark of Canon Inc.) type.

Discharge stability can be enhanced by discharging droplets of the ink from an inkjet head while the ink is heated. The temperature of the ink during discharge is preferably in a range of 40 to 100° C., and more preferably in a range of 40 to 90° C. in order to further enhance discharge stability. Emission is preferably performed at an ink temperature such that the viscosity of the ink is in a range of 7 to 15 mPa·s, and more preferably in a range of 8 to 13 mPa·s.

In a sol-gel phase transition type ink, in order to enhance a discharge property of the ink from an inkjet head, when the ink is filled in the inkjet head, the temperature of the ink is preferably set to (gelling temperature of the ink+10°) C to (gelling temperature of the ink+30°) C. When the temperature of the ink in the inkjet head is lower than (gelling temperature+10°) C, the ink becomes gel in the inkjet head or on a nozzle surface, and a discharge property of the ink tends to decrease. Meanwhile, when the temperature of the ink in the inkjet head exceeds (gelling temperature+30) ° C., the temperature of the ink becomes too high, and an ink component may be deteriorated.

A method for heating the ink is not particularly limited. For example, at least one of an ink supply system such as an ink tank constituting a head carriage, a supply pipe, or a front chamber ink tank just in front of a head, piping with a filter, and a piezo head can be heated with a panel heater, a ribbon heater, or a heat-retaining water.

The amount of ink droplets discharged from the inkjet head is preferably in a range of 2 to 20 pL from viewpoints of recording speed and image quality.

(5) Active Ray Irradiation

By irradiating the ink layer thus formed with an active ray, the ink layer can be cured.

The active ray can be selected from, for example, an electron beam, an ultraviolet ray, an a ray, a γ ray, and an X ray, and is preferably an ultraviolet ray.

In a case of irradiation with an ultraviolet ray, for example, a metal halide lamp, a high pressure mercury lamp, or an LED can be used as a light source. Irradiation with an ultraviolet ray can be performed under a condition of a wavelength of 395 nm using, for example, a water cooled LED manufactured by Phoseon Technology Co., Ltd. By using an LED as a light source, it is possible to prevent the ink from melting due to radiant heat of the light source, and to suppress poor curing of the ink.

Irradiation with an ultraviolet ray is performed such that a peak illuminance on an image surface of an ultraviolet ray having a wavelength in a range of 370 to 410 nm is preferably in a range of 0.5 to 10 W/cm$^2$, and more preferably in a range of 1 to 5 W/cm$^2$. The amount of light with which an image is irradiated is preferably less than 350 mJ/cm$^2$ from a viewpoint of suppressing irradiation with radiant heat onto the ink.

Irradiation with an active ray is performed preferably in 0.001 to 1.0 second after the ink is landed, more preferably in 0.001 and 0.5 seconds in order to form a high definition image.

Irradiation with an active ray may be performed in two stages. In this case, first, irradiation with an active ray may be performed in 0.001 to 2.0 seconds after the ink is landed, and irradiation with an active ray may be further performed after printing of all letters is completed. By performing irradiation with an active ray in two stages, shrinkage of a substrate hardly occurs with progress of polymerization.

2. Set of Substrate and Ink

Since the set of a substrate and ink according to an embodiment of the present invention is formed by the above-described substrate with a coating layer and the above-described active ray curable inkjet ink. Therefore, as described in detail in the above "1. inkjet recording method", when an image is recorded on a substrate having an outermost layer formed by polyethylene terephthalate, nylon, or aluminum, both suppression of blooming and scratch resistance can be achieved.

EXAMPLES

Hereinafter, Examples of the present invention will be described, but the present invention is not limited by the Examples.

(Tests 1 to 11)

1. Formation of Substrates 1 to 6 with Coating Layers

As a monomer, vinyl chloride, vinyl acetate, and methyl methacrylate were copolymerized at the content (monomer ratio) [% by mass] illustrated in Table 1 to obtain a copolymer. An aqueous solution (coating solution) of the obtained copolymer was applied onto an outermost layer (vapor-deposited aluminum layer) of a substrate formed of an aluminum vapor-deposited film (PET) and dried to form coating layers 1 to 6.

For the coating layers 1 to 6 thus formed, a chlorine/carbon ratio (Cl/C) by surface element analysis using ESCA was analyzed under the following analysis conditions. The results are illustrated in Table 1.

[Analysis Conditions of Surface Element Analysis Using ESCA]

The substrate on which the coating layer had been formed was cut out such that each side was about 10 mm, and surface composition analysis was performed using ESCA under the following conditions.

Measuring apparatus: "K-Alpha" manufactured by Thermo Scientific Co., Ltd.
Measuring light source: Al (monochromator)
Beam diameter: 400 μm
Neutralizing gun: ON
Spectrum: Narrow mode
Measuring element: C and Cl
Pass energy: 50 eV
Step size: 0.1 eV Cl and C in the chlorine/carbon ratio (Cl/C) correspond to a chlorine atom ratio and a carbon atom ratio (% by mass) present on a surface of the coating layer, respectively, and these atomic ratios are calculated from area intensity.

2. Preparation of Inks 1 to 5

(1) Preparation of Pigment Dispersion

[Preparation of Magenta Pigment Dispersion]

71 parts by mass of tripropylene glycol diacrylate and 9 parts by mass of "Ajisper PB824" manufactured by Ajinomoto Fine-Techno Co., Ltd. as a dispersant were put in a stainless steel beaker and stirred for one hour while being heated on a 65° C. hot plate, and the dispersant was dissolved. Subsequently, the resulting dispersant solution was cooled to room temperature. Thereafter, 20 parts by mass of "FASTOGEN SUPER MAGENTA RTS" manufactured by DIC Corporation was added thereto as a magenta pigment to prepare a mixed solution. Subsequently, the mixed solution was put in a glass bottle together with 200 g of zirconia beads each having a diameter of 0.5 mm. The glass bottle was tightly sealed, and the mixture was dispersed for five hours with a paint shaker. The zirconia beads were removed from the dispersion to prepare a magenta pigment dispersion.

[Preparation of White Pigment Dispersion]

A white pigment dispersion was prepared in a similar manner to the above-described preparation of the magenta pigment dispersion except that titanium oxide ("CR-80" manufactured by Ishihara Sangyo Kaisha, Ltd.) was used as a white pigment in place of the magenta pigment and the addition amount thereof was changed to 60 parts by mass.

(2) Preparation of Ink

The magenta pigment dispersion thus prepared, the white pigment dispersion thus prepared, and photopolymerizable compounds 1 to 3, photopolymerization initiators 1 and 2, surfactant 1, polymerization inhibitor 1, and gelling agents 1 and 2 described below were mixed at a blending ratio illustrated in Table 1 and stirred while being heated at 80° C. Subsequently, in a heated state, the mixed solution was filtered using a Teflon (registered trademark) 3 μm membrane filter (manufactured by Advantec Toyo) to prepare inks 1 to 5. There was no substantial change in ink composition before and after filtration.

Photopolymerizable compound 1: N-vinylcaprolactam (manufactured by BASF)
Photopolymerizable compound 2: polyethylene glycol #600 diacrylate ("SR610" manufactured by SARTOMER)

Photopolymerizable compound 3: 3PO-modified trimethylolpropane triacrylate ("M360" manufactured by Miwon Specialty Chemical Co., Ltd.)

Photopolymerization initiator 1: "DUROCUR TPO" manufactured by BASF

Photopolymerization initiator 2: "IRGACURE 819" manufactured by BASF

Surfactant 1: "BYK UV3500" manufactured by BYK Japan K.K.

Polymerization inhibitor 1: "Irgatab UV10" manufactured by BASF

Gelling agent G1: "AMREPS PC" manufactured by Kokyu Alcohol Kogyo Co., Ltd.

Gelling agent G2: "EMALEX EG-di-S" manufactured by Nihon Emulsion Co., Ltd.

3. Inkjet Recording Method

The prepared inks 1 to 5 were loaded in a line type inkjet recording apparatus including an inkjet recording head (multi drop of 6 to 42 pl, resolution of 360 dpi) equipped with a piezo type inkjet nozzle.

An ink supply system included an ink tank, an ink flow path, a sub ink tank just in front of the inkjet recording head, piping with a filter, and a piezo head. Heating was performed such that the temperature of a portion from the ink tank to the head portion was 100° C., and the temperature of a conveying base of a recording medium (here, a substrate with a coating layer) was 40° C.

An image was formed on each of the coating layers of the substrates 1 to 6 with coating layers using inks 1 to 5. Within five seconds after the formation, inks 1 to 5 were cured using the following ultraviolet irradiation unit to form image 11.

Each of the inks was cured by being irradiated with light (395 nm, 4 W/cm$^2$, water cooled unit) from an ultraviolet irradiation unit (LED lamp manufactured by Phoseon Technology). The cumulative amount of light was appropriately adjusted by changing a conveying speed of the recording medium so as to be 500 mJ/cm$^2$, and was measured using ultraviolet integrated cumulometers C9536 and H9958 manufactured by Hamamatsu Photonics K.K.

4. Evaluation Method (1) Adhesion (Adhesion Between Al Substrate and Coating Layer; Tape Peeling Test)

A 2 cm cellophane adhesive tape was bonded to a coating layer (3×3 cm) before formation of an image. An upper surface of the cellophane adhesive tape was rubbed with an eraser to make the cellophane adhesive tape adhere sufficiently to a coating surface. Thereafter, the cellophane adhesive tape was peeled off at 90°. A subsequent surface condition of the coating layer was observed and evaluated according to the following evaluation criteria.

[Evaluation Criteria]

⊚: No change was observed at all

○: A mark remained slightly

Δ: A part of a coating layer was peeled off slightly, and an Al surface (vapor-deposited aluminum layer) of the substrate was slightly visible x: Most of a coating layer was peeled off, and an Al surface of the substrate was visible In the above evaluation ranks, ranks of Δ or higher were judged to be practically preferable.

(2) Scratch Resistance Test

A portion from an upper side to a lower side of the formed image (3×3 cm) was rubbed with a nail three times. The image was evaluated according to the following criteria based on presence or absence of a scratch on an image surface and the size of a white spot.

[Evaluation Criteria]

⊚: No scratch or white spot was generated

○: Although an image surface was scratched slightly, no white spot was generated at all Δ: A white spot having a length of less than 0.5 cm was generated in an image x: A white spot having a length of 0.5 cm or more was generated in an image In the above evaluation ranks, ranks of Δ or higher were judged to be practically preferable.

(3) Evaluation of Blooming

A coating layer was applied to Al vapor-deposited PET as a recording medium by the above method, and the formed solid image of 5 cm×5 cm was stored under an environment of 40° C. for one month. The image after storage was visually observed, and blooming was evaluated according to the following criteria.

[Evaluation Criteria]

○: No precipitate was observed on an image surface.

Δ: There was a thin precipitate on an image surface that could be visually confirmed.

x: An image surface was covered with a powdery material that could be visually confirmed clearly.

In the above evaluation ranks, ranks of Δ or higher were judged to be practically preferable.

The above results are illustrated in Table 1.

TABLE 1

|  |  |  | Test 1 | Test 2 | Test 3 | Test 4 | Test 5 | Test 6 |
|---|---|---|---|---|---|---|---|---|
| Coating layer |  | No. | 1 | 2 | 3 | 4 | 1 | 1 |
|  | Monomer ratio [% by mass] | Vinyl chloride | 7 | 26 | 90 | 28 | 7 | 7 |
|  |  | Vinyl acetate | 93 | 74 | 10 | — | 93 | 93 |
|  |  | Methyl methacrylate | — | — | — | 72 | — | — |
|  |  | Cl/C ratio | 0.025 | 0.1 | 0.43 | 0.1 | 0.025 | 0.025 |
| Ink |  | No. | 1 | 1 | 1 | 1 | 2 | 3 |
|  |  | (Color) | (Magenta) | (Magenta) | (Magenta) | (Magenta) | (White) | (Magenta) |
|  | Composition [% by mass] | Magenta pigment dispersion | 20 | 20 | 20 | 20 | — | 20 |
|  |  | White pigment dispersion | — | — | — | — | 25 | — |
|  |  | Photopolymerizable compound 1 | 10 | 10 | 10 | 10 | 10 | 10 |
|  |  | Photopolymerizable compound 2 | 22 | 22 | 22 | 22 | 22 | 22 |
|  |  | Photopolymerizable compound 3 | 37.5 | 37.2 | 37.2 | 37.2 | 32.2 | 42.7 |
|  |  | Photopolymerization initiator 1 | 1.5 | 1.5 | 1.5 | 1.5 | 1.5 | 1.5 |

TABLE 1-continued

|  |  |  |  |  |  |  |  |
|---|---|---|---|---|---|---|---|
|  |  | Photopolymerization initiator 2 | 3 | 3 | 3 | 3 | 3 | 3 |
|  |  | Surfactant 1 | 0.1 | 0.1 | 0.1 | 0.1 | 0.1 | 0.1 |
|  |  | Polymerization inhibitor 1 | 0.2 | 0.2 | 0.2 | 0.2 | 0.2 | 0.2 |
|  |  | Gelling agent G1 | 2 | 2 | 2 | 2 | 2 | 0.3 |
|  |  | Gelling agent G2 | 4 | 4 | 4 | 4 | 4 | 0.2 |
|  | Gelling agent (total amount) |  | 6 | 6 | 6 | 6 | 6 | 0.5 |
| Evaluation | Adhesion |  | ○ | ○ | ⊙ | ○ | ○ | ○ |
|  | Scratch resistance |  | Δ | ○ | ⊙ | ○ | ○ | ⊙ |
|  | Suppression of blooming |  | ○ | ○ | Δ | ○ | ○ | ○ |
| Note |  |  | Present invention | Present invention | Present invention | Present invention | Present invention | Present invention |

|  |  |  | Test 7 | Test 8 | Test 9 | Test 10 | Test 11 |
|---|---|---|---|---|---|---|---|
| Coating layer | | No. | 1 | 1 | 2 | 5 | 6 |
| | Monomer ratio [% by mass] | Vinyl chloride | 7 | 7 | 26 | 4 | 95 |
| | | Vinyl acetate | 93 | 93 | 74 | 96 | 5 |
| | | Methyl methacrylate | — | — | — | — | — |
| | | Cl/C ratio | 0.025 | 0.025 | 0.1 | 0.015 | 0.46 |
| Ink | | No. | 4 | 5 | 1 | 1 | 1 |
| | | (Color) | (Magenta) | (Magenta) | (Magenta) | (Magenta) | (Magenta) |
| | Composition [% by mass] | Magenta pigment dispersion | 20 | 20 | 20 | 20 | 20 |
| | | White pigment dispersion | — | — | — | — | — |
| | | Photopolymerizable compound 1 | 10 | 10 | 10 | 10 | 10 |
| | | Photopolymerizable compound 2 | 22 | 22 | 22 | 22 | 22 |
| | | Photopolymerizable compound 3 | 41.2 | 38.2 | 37.2 | 37.2 | 37.2 |
| | | Photopolymerization initiator 1 | 1.5 | 1.5 | 1.5 | 1.5 | 1.5 |
| | | Photopolymerization initiator 2 | 3 | 3 | 3 | 3 | 3 |
| | | Surfactant 1 | 0.1 | 0.1 | 0.1 | 0.1 | 0.1 |
| | | Polymerization inhibitor 1 | 0.2 | 0.2 | 0.2 | 0.2 | 0.2 |
| | | Gelling agent G1 | 1 | 2 | 2 | 2 | 2 |
| | | Gelling agent G2 | 1 | 3 | 4 | 4 | 4 |
| | Gelling agent (total amount) | | 2 | 5 | 6 | 6 | 6 |
| Evaluation | Adhesion | | ○ | ○ | ○ | Δ | ⊙ |
| | Scratch resistance | | ⊙ | ⊙ | ○ | X | ⊙ |
| | Suppression of blooming | | ○ | ○ | ○ | ○ | X |
| Note | | | Present invention | Present invention | Present invention | Comparison | Comparison |

(Tests 12 to 22)

Tests 12 to 22 were performed in a similar manner to tests 1 to 11 except that a PET film (having an outermost layer formed by PET) was used in place of the aluminum vapor-deposited film as the substrate. The results were similar to tests 1 to 11 (Table 1).

(Tests 23 to 33)

Tests 23 to 33 were performed in a similar manner to tests 1 to 11 except that a nylon film (having an outermost layer formed by nylon) was used in place of the aluminum vapor-deposited film as the substrate. The results were similar to tests 1 to 11 (Table 1).

5. Evaluation

Table 1 indicates that the present invention (tests 1 to 9) can achieve both suppression of blooming and scratch resistance when an image is recorded on a substrate having an outermost layer formed by polyethylene terephthalate, nylon, or aluminum.

In contrast, in test 11 in which the Cl/C ratio of the coating layer exceeds 0.43, hydrophilicity of the coating layer is too high, the gelling agent is aligned on a surface of the ink layer, and blooming cannot be suppressed.

In test 10 in which the Cl/C ratio of the coating layer was less than 0.025, bonding (adhesion) between an outermost layer (polyethylene terephthalate, nylon, or aluminum) of the substrate and the coating layer was still tolerable, but the gelling agent was aligned to the coating layer side. Therefore, a portion where the gelling agent was aligned became weakest when being scratched, and cohesive failure occurred.

It is indicated that test 5 using a white ink containing titanium oxide further improved scratch resistance as compared with a test (for example, test 1) using an ink of another color (magenta pigment). It is considered that this is because use of titanium oxide more reliably prevents alignment of the gelling agent to a coating layer side, and the gelling agent is distributed in a good balance in the ink layer.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inkjet recording method comprising:
applying an active ray curable inkjet ink onto a coating layer disposed on a substrate by an inkjet method to form an ink layer, and
subsequently irradiating the ink layer with an active ray to cure the ink layer, wherein
the substrate has an outermost layer formed by at least one selected from polyethylene terephthalate, nylon, and aluminum,
the coating layer is disposed on the outermost layer of the substrate and satisfies a condition that a chlorine/carbon ratio (Cl/C) by surface element analysis using electron spectroscopy for chemical analysis (ESCA) is 0.025≤(Cl/C)≤0.43, and
the active ray curable inkjet ink contains at least a photopolymerizable compound, a photopolymerization initiator, a pigment, and a gelling agent.

2. The inkjet recording method according to claim 1, wherein the coating layer contains at least a vinyl chloride polymer or a vinyl chloride copolymer.

3. The inkjet recording method according to claim 1, wherein the active ray curable inkjet ink contains at least titanium oxide as the pigment.

4. The inkjet recording method according to claim 1, wherein the gelling agent has a content of 0.5% by mass or more and 5% by mass or less with respect to a total amount of the active ray curable inkjet ink.

5. The inkjet recording method according to claim 1, wherein the active ray curable inkjet ink contains at least one selected from a compound represented by the following general formula (G1) and a compound represented by the following general formula (G2) as the gelling agent:

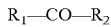  General formula (G1)

  General formula (G2)

where $R_1$ to $R_4$ each independently represent a linear or branched hydrocarbon group having 9 to 25 carbon atoms.

6. A set of a substrate and ink, comprising:
a substrate with a coating layer that includes a substrate having an outermost layer formed by at least one selected from polyethylene terephthalate, nylon, and aluminum, and a coating layer disposed on the substrate, the coating layer satisfying a condition that a chlorine/carbon ratio (Cl/C) by surface element analysis using ESCA is 0.025≤(Cl/C)≤0.43; and
an active ray curable inkjet ink that contains at least a photopolymerizable compound, a photopolymerization initiator, a pigment, and a gelling agent and performs inkjet recording on the coating layer of the substrate with the coating layer.

7. The set of a substrate and ink according to claim 6, wherein the coating layer contains at least a vinyl chloride polymer or a vinyl chloride copolymer.

8. The set of a substrate and ink according to claim 6, wherein the active ray curable inkjet ink contains at least titanium oxide as the pigment.

9. The set of a substrate and ink according to claim 6, wherein the gelling agent has a content of 0.5% by mass or more and 10% by mass or less with respect to a total amount of the active ray curable inkjet ink.

10. The set of a substrate and ink according to claim 6, wherein the active ray curable inkjet ink includes at least one selected from a compound represented by the following general formula (G1) and a compound represented by the following general formula (G2) as the gelling agent:

  General formula (G1)

  General formula (G2)

where $R_1$ to $R_4$ each independently represent a linear or branched hydrocarbon group having 9 to 25 carbon atoms.

* * * * *